B. F. SMITH.
Grain Drill.
No. 40,435. Patented Oct. 27, 1863.
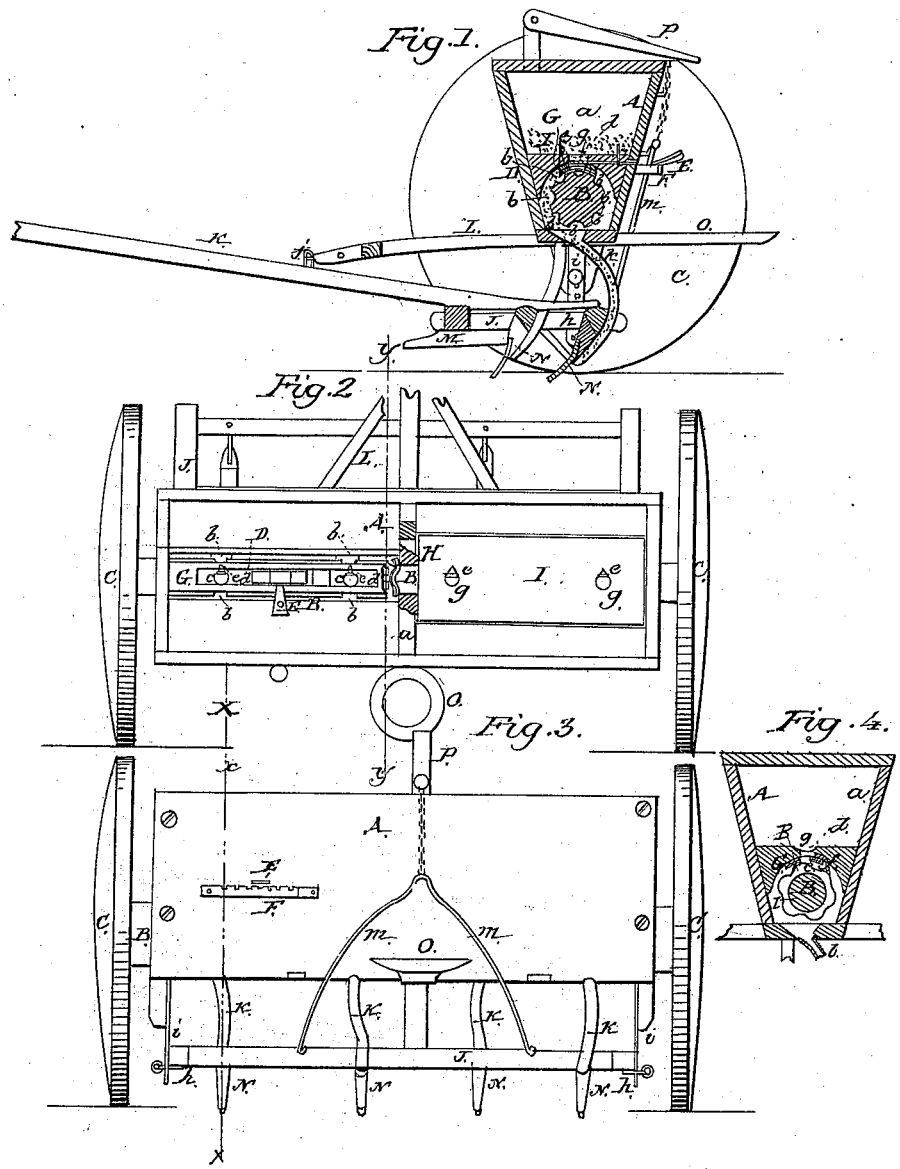

UNITED STATES PATENT OFFICE.

B. F. SMITH, OF UNITY, IOWA.

IMPROVEMENT IN GRAIN-DRILLS.

Specification forming part of Letters Patent No. 40,435, dated October 27, 1863.

*To all whom it may concern:*

Be it known that I, B. F. SMITH, of Unity, in the county of Benton and State of Iowa, have invented a new and Improved Grain-Drill; and I do hereby declare that the following is a full, clear, and exact description of the same, reference being had to the accompanying drawings, forming part of this specification, in which—

Figure 1 is a side sectional view of my invention, taken in the line $xx$, Fig. 3. Fig. 2 is a plan or top view of the same, partly in section; Fig. 3, a back view of the same; Fig. 4, a section of the same, taken in the line $yy$, Fig. 2; Fig. 5, an enlarged transverse section of the seed-distributing device, taken in the same line $xx$ as Fig. 1.

Similar letters of reference indicate corresponding parts in the several figures.

This invention consists in the employment or use of a rotating cylinder provided with seed-cells and placed longitudinally within a proper seed-box, in connection with a gage-slide and reciprocating stirrer, all arranged to operate in such a manner as to insure the proper discharge of the seed and effectually prevent choking and clogging.

The invention further consists in a novel and improved arrangement of a drill-frame and the draft-pole, applied to the machine and arranged to operate in such a manner that the drill-frame may be set so as to have its teeth penetrate a greater or less distance into the ground, the horses relieved of downward pressure on their necks, the device nicely balanced on its wheels, and the teeth readily raised above the surface of the ground when required.

To enable those skilled in the art to fully understand and construct my invention, I will proceed to describe it.

A represents a seed-box, the front and rear sides of which are inclined, and which is provided centrally with a transverse vertical partition, $a$.

B is a shaft, which is placed longitudinally in the lower part of the seed-box and extends through the ends of the same, and has a wheel, C, on each end. (See Figs. 2 and 3.) This shaft B has a series of holes or seed-cells, $b$, made circumferentially in it at equal and suitable distances apart, and on the upper part of said shaft there is placed a slide, D, which is perforated with holes $c$, which are near the holes or seed-cells $b$ in the shaft B. By adjusting this slide D the capacity of the seed-cells $b$ may be varied as desired. When the holes $c$ in the slides D register fully with the seed-cells $b$, on or directly in line with them, the full capacity of the seed-cells is obtained; but when the holes $c$ do not fully register with the seed-cells $b$ the latter will be more or less covered by the slide at the edges of the holes $c$ and the capacity of the seed-cells correspondingly diminished. The slide D is adjusted by a lever, E, which passes through the rear side of the seed-box and is retained at different points by a semicircular notched bar, F, attached to the back of the seed-box. (See Fig. 3.)

G represents a metal plate, which is placed directly over the slide D, and has oblong slots $d$ made in it, so that the seed-cells will not be obstructed. This plate G is provided with upright spurs $e$ in the vicinity of the seed-cells $b$, or directly in front. The plate G has its ends fitted in the ends of the seed-box A, and a vibrating movement is given it by means of a serpentine cam, H, which is placed on the shaft C at about its center, said cam being at one side of the partition $a$ and working in a notched plate, $f$, attached to the plate G. (See Fig. 4.)

Directly over the plate G there are placed horizontal partition-plates I I, one at each side of the vertical partition $a$, and these plates I I have each two holes, $g\, g$, made in them of sufficient capacity to admit of the seed passing through them into the seed-cells $b$ of the shaft C. The spurs $e$ of the plate G project up through the holes $g$ in the plates I, said holes being sufficiently large to admit of a requisite degree of vibration or play of the spurs. The spurs $e$ effectually prevent the holes $g$ and seed-cells $b$ from becoming choked or clogged, and consequently insure a uniform distribution of the seed. It will be understood that the shaft C, slide D, and vibrating plate G all pass through the partition $a$.

J is a rectangular frame, which is placed underneath the seed-box A, and has its back part resting upon pins $h\, h$, which pass through pendent bars $i\, i$ at each end of the seed-box. (See Figs. 1 and 3.)

K is the draft-pole, which is attached centrally to the frame J, and is connected by a joint, $j$, at a point just in front of the frame J, to the front end of a frame, L, which is attached to the lower part of the seed-box. The team is hitched to a bar, M, attached centrally to the under side of the frame J. By this arrangement it will be seen that as the machine is drawn along, the draft will have a tendency to throw the draft-pole K slightly upward, so as to relieve the necks of the horses from downward pressure. The team therefore is greatly relieved, and will be enabled to work with far greater ease and facility than usual. The frame J has drill-teeth N attached to it in an inclined position. These teeth are tubular, and correspond in number with the number of series of seed-cells $b$ in the shaft C. These teeth N are tubular, and they are made to communicate by means of elastic tubes $k$ with tubes $l$, which are fitted in the bottom of the seed-box A, and through which the seed passes from the seed-cells $b$ in the shaft C. The seed passes down through the tubular teeth N into the drills or furrows prepared to receive them by the lower ends of the teeth.

O represents the driver's seat, which is attached to the back part of the seed-box A. The driver while on his seat may rest his feet on the back part of the frame J. The weight of the driver serves to counterpoise the machine. The frame J may be elevated at any time by means of rods $m$, which are connected to a lever, P, on the top of the seed-box. This raising of the frame J will elevate the teeth N above the surface of the ground, which is necessary in turning at the ends of the field or in drawing the machine from place to place.

I would remark that the teeth of the frame J may be made to penetrate a greater or less distance into the earth by adjusting the pins $h\ h$ higher or lower in the bars $i\ i$, and I would further remark that the shaft B is rotated by the wheel C.

Having thus described my invention, what I claim as new, and desire to secure by Letters Patent, is—

1. The shaft B, provided with seed-cells $b$, in combination with the slide D, partition-plates I I, provided with holes $g$, and vibrating plate G. provided with spurs $e$, and operated through the medium of the cam H, all arranged as and for the purpose set forth.

2. The combination of the tooth-frame J, with draft-bar M attached, and the draft-pole K, when arranged as shown and applied to the machine to operate in the manner as and for the purpose herein specified.

B. F. SMITH.

Witnesses:
S. SMITH,
P. S. SMITH.